US011912235B2

(12) United States Patent
Salter et al.

(10) Patent No.: US 11,912,235 B2
(45) Date of Patent: Feb. 27, 2024

(54) VEHICLE OBJECT DETECTION (71) Applicant: Ford Global Technologies, LLC, Dearborn, MI (US)

(72) Inventors: Stuart C. Salter, White Lake, MI (US); John Robert Van Wiemeersch, Novi, MI (US); Sam Harris, Billericay (GB); Tarik Safir, Chesterfield (GB); Donald Paul Bilger, Livonia, MI (US); Thomas Joseph Hermann, Troy, MI (US); Todd Ansbacher, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 17/199,954

(22) Filed: Mar. 12, 2021

(65) Prior Publication Data
US 2022/0289143 A1 Sep. 15, 2022

(51) Int. Cl.
*B60R 25/31* (2013.01)
*B60R 25/40* (2013.01)
*B60R 25/10* (2013.01)
*G05D 1/02* (2020.01)
*B60R 25/102* (2013.01)
*G05D 1/00* (2006.01)

(52) U.S. Cl.
CPC ............ *B60R 25/31* (2013.01); *B60R 25/102* (2013.01); *B60R 25/1018* (2013.01); *B60R 25/403* (2013.01); *G05D 1/0214* (2013.01); *B60R 2025/1013* (2013.01)

(58) Field of Classification Search
CPC ... B60R 25/31; B60R 25/1018; B60R 25/102; B60R 25/403; B60R 2025/1013; G05D 1/0214
USPC .......................................................... 701/25
See application file for complete search history.

(56) References Cited

U.S. PATENT DOCUMENTS

| 5,563,576 | A | 10/1996 | Drori et al. |
| 5,581,464 | A | 12/1996 | Woll et al. |
| 7,417,585 | B2 | 8/2008 | Yamagami et al. |
| 8,768,549 | B2 | 7/2014 | Erko et al. |
| 9,266,443 | B2 | 2/2016 | Payne et al. |
| 9,344,683 | B1 | 5/2016 | Nemat-Nasser et al. |

(Continued)

FOREIGN PATENT DOCUMENTS

| DE | 102015118874 A1 | 5/2017 |
| WO | 2009094367 A1 | 7/2009 |

(Continued)

OTHER PUBLICATIONS

Final Office Action dated Dec. 6, 2022 dated re U.S. Appl. No. 17/199,805, filed Mar. 12, 2021.

(Continued)

*Primary Examiner* — Krishnan Ramesh
(74) *Attorney, Agent, or Firm* — Frank Lollo; Bejin Bieneman PLC (57) ABSTRACT

While a vehicle is in a minimal power state, a first sensor is activated based on a location of the vehicle within a monitored area. The vehicle is transitioned to an on state based on detecting an object via data from the first sensor. Then the vehicle is operated to block an exit from the monitored area based on identifying the object as an unauthorized object.

20 Claims, 8 Drawing Sheets

(56) References Cited

U.S. PATENT DOCUMENTS

| | | |
|---|---|---|
| 9,394,059 B2 | 7/2016 | Cox et al. |
| 9,412,268 B2 | 8/2016 | Saptharishi et al. |
| 9,438,868 B2 | 9/2016 | Boettiger |
| 9,784,229 B2 | 10/2017 | Holub et al. |
| 9,880,278 B2 | 1/2018 | van Uffelen et al. |
| 10,600,257 B2 | 3/2020 | Jiang et al. |
| 10,607,458 B1 | 3/2020 | Sampson et al. |
| 10,712,742 B2 | 7/2020 | Valois |
| 10,850,709 B1 | 12/2020 | Nagata et al. |
| 10,899,317 B1 | 1/2021 | Moeller et al. |
| 11,099,264 B2 | 8/2021 | Bhatia et al. |
| 11,104,270 B1 | 8/2021 | Timms |
| 11,206,465 B1 | 12/2021 | Krotosky |
| 11,427,143 B1 | 8/2022 | Linsmeier et al. |
| 11,823,564 B1 | 11/2023 | Wittevrongel et al. |
| 2003/0030548 A1* | 2/2003 | Kovacs ............... B60R 25/102 340/13.24 |
| 2004/0257045 A1 | 12/2004 | Sada et al. |
| 2005/0073433 A1 | 4/2005 | Gunderson et al. |
| 2005/0193212 A1 | 9/2005 | Yuhara |
| 2005/0200606 A1 | 9/2005 | Willemin et al. |
| 2007/0067079 A1 | 3/2007 | Kosugi |
| 2008/0097664 A1 | 4/2008 | Aoyama et al. |
| 2009/0064696 A1 | 3/2009 | Perkins |
| 2010/0265344 A1 | 10/2010 | Velarde et al. |
| 2011/0216200 A1 | 9/2011 | Chung et al. |
| 2012/0044046 A1* | 2/2012 | Al-Jafar ............... E01F 13/085 340/5.2 |
| 2012/0044327 A1 | 2/2012 | Horita et al. |
| 2012/0188054 A1* | 7/2012 | Bongard ........... G07C 9/00571 340/5.2 |
| 2013/0117078 A1* | 5/2013 | Weik, III ............. G06Q 10/00 705/13 |
| 2014/0067152 A1 | 3/2014 | Swanson et al. |
| 2015/0042815 A1* | 2/2015 | Park ..................... H04N 7/181 348/159 |
| 2016/0104325 A1* | 4/2016 | Lu ........................ G06Q 10/00 705/13 |
| 2016/0323508 A1 | 11/2016 | Ayalasomayajula et al. |
| 2016/0331192 A1 | 11/2016 | Rubenson et al. |
| 2016/0332535 A1 | 11/2016 | Bradley et al. |
| 2016/0356594 A1 | 12/2016 | Sorenson |
| 2017/0075888 A1 | 3/2017 | Ekin |
| 2017/0160392 A1 | 6/2017 | Brisimitzakis et al. |
| 2017/0337435 A1 | 11/2017 | Uliyar et al. |
| 2018/0053313 A1 | 2/2018 | Smith |
| 2018/0147986 A1 | 5/2018 | Chi et al. |
| 2018/0324393 A1 | 11/2018 | Ryan et al. |
| 2018/0332218 A1 | 11/2018 | Yoshimura |
| 2019/0102963 A1 | 4/2019 | Owens et al. |
| 2019/0108010 A1 | 4/2019 | Tillman et al. |
| 2019/0122460 A1 | 4/2019 | Reyes et al. |
| 2019/0141419 A1 | 5/2019 | Xu et al. |
| 2019/0225150 A1 | 7/2019 | Nohl et al. |
| 2019/0228647 A1 | 7/2019 | Conde et al. |
| 2019/0249635 A1 | 8/2019 | Khafagy et al. |
| 2019/0391250 A1 | 12/2019 | Cohen et al. |
| 2020/0025964 A1 | 1/2020 | Kubo |
| 2020/0031312 A1 | 1/2020 | Schat et al. |
| 2020/0033849 A1* | 1/2020 | Yiu ..................... G05D 1/0022 |
| 2020/0114886 A1 | 4/2020 | Kim |
| 2020/0209377 A1 | 7/2020 | Ogura et al. |
| 2020/0209869 A1 | 7/2020 | Totoura et al. |
| 2020/0247423 A1 | 8/2020 | Almahmoud et al. |
| 2020/0282921 A1 | 9/2020 | Herman |
| 2020/0327757 A1 | 10/2020 | Kelley et al. |
| 2020/0339101 A1 | 10/2020 | Gantt, Jr. et al. |
| 2020/0408876 A1 | 12/2020 | Weber et al. |
| 2021/0001810 A1 | 1/2021 | Rivard et al. |
| 2021/0026019 A1 | 1/2021 | Gahagan et al. |
| 2021/0086761 A1* | 3/2021 | El Assaad ........... B60R 16/0231 |
| 2021/0092321 A1 | 3/2021 | Li et al. |
| 2021/0178936 A1 | 6/2021 | Yetukuri et al. |
| 2021/0223359 A1 | 7/2021 | Harrison |
| 2021/0245662 A1 | 8/2021 | Blank et al. |
| 2021/0309183 A1 | 10/2021 | Bielby et al. |
| 2021/0309257 A1 | 10/2021 | Roberts et al. |
| 2021/0349204 A1 | 11/2021 | Brodsky et al. |
| 2022/0123570 A1* | 4/2022 | Fuchs ..................... H02J 9/002 |
| 2022/0126832 A1 | 4/2022 | Ewert |
| 2022/0250583 A1 | 8/2022 | Garg et al. |
| 2023/0056115 A1 | 2/2023 | Arnold et al. |

FOREIGN PATENT DOCUMENTS

| | | |
|---|---|---|
| WO | 2019013948 A1 | 1/2019 |
| WO | 2021003440 A1 | 1/2021 |

OTHER PUBLICATIONS

Non-Final Office Action dated Mar. 28, 2023 re U.S. Appl. No. 17/099,869, filed Nov. 17, 2020.

Non-Final Office Action dated Aug. 23, 2022 re U.S. Appl. No. 17/199,805, filed Mar. 12, 2021.

Ex Parte Quayle Action dated Jun. 23, 2023 re U.S. Appl. No. 17/199,768, filed Mar. 12, 2021.

Non-Final Office Action dated Sep. 13, 2023 re U.S. Appl. No. 17/199,887, filed Mar. 12, 2021.

Notice of Allowance dated Jul. 13, 2023 re U.S. Appl. No. 17/099,869, filed Nov. 17, 2020.

Non-Final Office Action dated Jul. 19, 2023 re U.S. Appl. No. 17/199,688, filed Mar. 12, 2021.

Notice of Allowance dated Dec. 28, 2023 re U.S. Appl. No. 17/199,688, filed Mar. 12, 2021.

Notice of Allowance dated Dec. 29, 2023 re U.S. Appl. No. 17/199,887, filed Mar. 12, 2021.

* cited by examiner

VEHICLE OBJECT DETECTION

BACKGROUND

An infrastructure element may monitor an area to detect objects within the area. The infrastructure element may be able to obtain data about objects, hazards, etc. in the area. For example, the infrastructure element may include a sensor having a field of view that encompasses at least a portion of the area. The field of view may be obstructed by certain objects within the area, which prevents the infrastructure element from monitoring portions of the area.

DETAILED DESCRIPTION

An infrastructure element can monitor an area such as a parking area. For example, the infrastructure element can include an infrastructure sensor having a field of view that encompasses the monitored area. However, objects in the monitored area, e.g., parked vehicles, can obstruct a portion of the field of view of the infrastructure sensor creating blind zones within the monitored area. Advantageously, a vehicle computer can provide an energy-efficient way to monitor the blind zones within the monitored area. While in a minimal power state, the vehicle computer can activate a first sensor having a field of view that encompasses the blind zone. Upon detecting an object via data from the first sensor, the vehicle computer can transition the vehicle to an on state and activate a second sensor having a field of view that encompasses the blind zone. The vehicle computer can then operate a vehicle to block an exit of the monitored area based on identifying the object as an unauthorized object via data from the second sensor. Activating vehicle sensors to monitor the blind zones within the monitored area can increase the likelihood of identifying unauthorized persons or vehicles within the monitored area. Additionally, preventing activation of the second sensor, which is more energy-intensive than the first sensor, in the minimal power state saves energy. The energy savings are important when the vehicle is in the minimal power state and relying on a finite supply of stored energy.

A system includes a first sensor and a second sensor having a higher power draw than the first sensor. A computer is communicatively coupled to the first sensor and the second sensor. The computer includes a processor and a memory, the memory storing instructions executable by the processor to, while a vehicle is in a minimal power state, activate the first sensor based on a location of the vehicle within a monitored area. The instructions further include instructions to transition the vehicle to an on state based on detecting an object via data from the first sensor. The instructions further include instructions to, upon transitioning to the on state, activate a second sensor. The instructions further include instructions to then operate the vehicle to block an exit from the monitored area based on identifying the object, via data from the second sensor, as an unauthorized object.

The first sensor may be a radar, and the second sensor may be a camera.

The system may include a housing containing the first sensor and the second sensor.

The location may be adjacent to a boundary of the monitored area.

The location may be adjacent to a blind zone within the monitored area.

The first sensor may be arranged so that a field of view of the first sensor encompasses the blind zone, and the second sensor may be arranged so that a field of view of the second sensor encompasses the blind zone.

A system includes a computer including a processor and a memory, the memory storing instructions executable by the processor to, while a vehicle is in a minimal power state, activate a first sensor based on a location of the vehicle within a monitored area. The instructions further include instructions to transition the vehicle to an on state based on detecting an object via data from the first sensor. The instructions further include instructions to then operate the vehicle to block an exit from the monitored area based on identifying the object as an unauthorized object.

The instructions can further include instructions to, upon transitioning the vehicle to the on state, activate a second sensor, wherein the second sensor has a higher power draw than the first sensor.

The instructions can further include instructions to provide data from the second sensor to a remote computer.

The instructions can further include instructions to identify the object based on data from the second sensor.

The instructions can further include instructions to, upon identifying the object as an unauthorized person, actuate an alarm in the vehicle.

The instructions can further include instructions to, upon identifying the object as an animal, transition the vehicle to the minimal power state.

The instructions can further include instructions to, upon transitioning the vehicle to the on state, activate exterior lights of the vehicle.

The instructions can further include instructions to transition the vehicle to the minimal power state based on a time of day.

The instructions can further include instructions to, upon determining that the object has departed the monitored area, operate the vehicle to follow the object.

The instructions can further include instructions to transition the vehicle to the on state additionally based on receiving a first message from a remote computer.

The instructions can further include instructions to operate the vehicle to block the exit from the monitored area additionally based on receiving a second message from the remote computer.

The location may be adjacent to a blind zone within the monitored area.

The instructions can further include instructions to determine the blind zone based on a field of view of an infrastructure sensor within the monitored area.

The location may be adjacent to a boundary of the monitored area.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-3B, an example vehicle control system 100 includes a vehicle 105. A vehicle computer 110 in the vehicle 105 receives data from sensors 115, including a first sensor 115a and a second sensor 115b. The vehicle computer 110 is programmed to while the vehicle 105 is in a minimal power state, activate the first sensor 115a based on a location of the vehicle 105 within a monitored area 300. The vehicle computer 110 is further programmed to transition the vehicle 105 to an on state based on detecting an object 320 via data from the first sensor 115a. The vehicle computer 110 is further programmed to then operate the vehicle 105 to block an exit 305 from the monitored area 300 based on identifying the object 320 as an unauthorized object.

Figure 1:
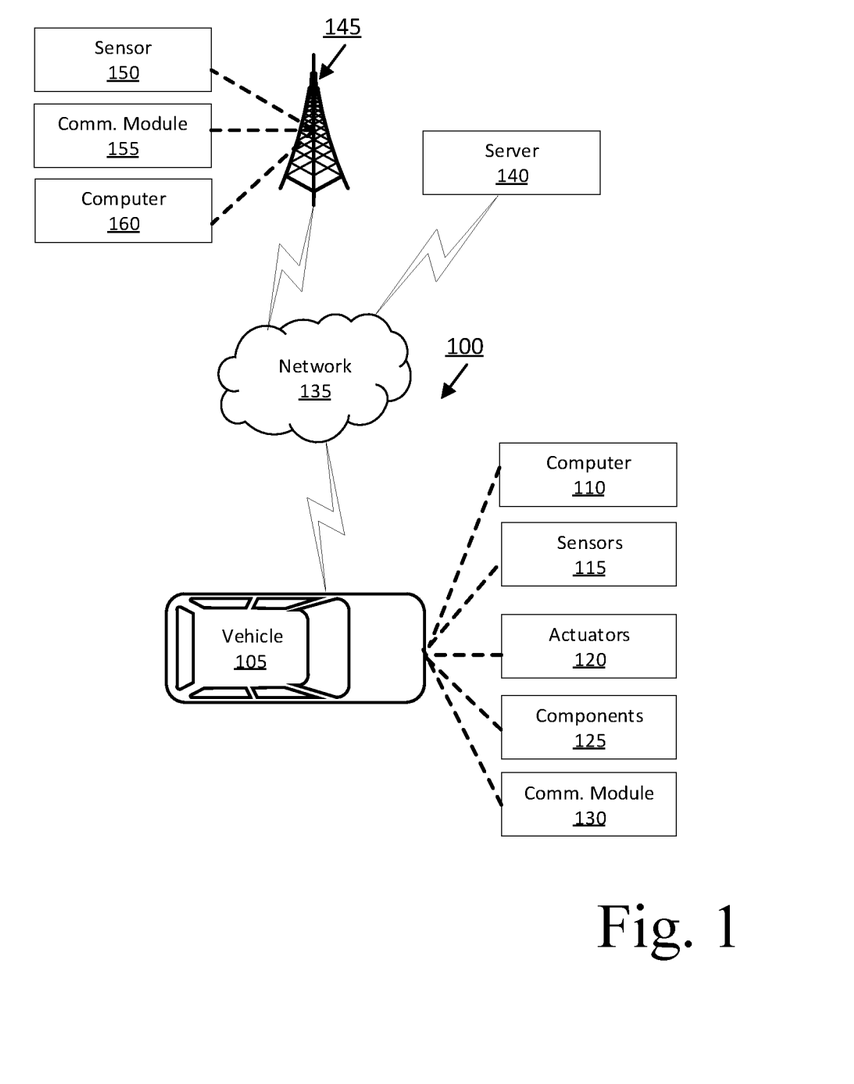
FIG. 1 is a block diagram illustrating an example vehicle control system for a vehicle.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, and/or other vehicles, e.g., via a messaging or broadcast protocol such as Dedicated Short Range Communications (DSRC), cellular, IEEE 802.11, Bluetooth®, Ultra-Wideband (UWB), and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105.

As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, UWB, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, UWB, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

An infrastructure element 145 includes a physical structure such as a tower, pole, etc., on or in which infrastructure sensors 150, as well as an infrastructure communications module 155 and computer 160 can be housed, mounted, stored, and/or contained, and powered, etc. One infrastructure element 145 is shown in FIG. 1 for ease of illustration, but the system 100 could and likely would include a plurality of infrastructure elements 145.

An infrastructure element 145 is typically stationary, i.e., fixed to and not able to move from a specific physical location. The infrastructure sensors 150 may include one or more sensors such as described above for the vehicle 105 sensors 115, e.g., LIDAR, radar, cameras, ultrasonic sensors, etc. The infrastructure sensors 150 are fixed or stationary. That is, each infrastructure sensor 150 is mounted to the infrastructure element 145 so as to have a substantially unmoving and unchanging field of view.

Infrastructure sensors 150 thus provide field of views in contrast to vehicle 105 sensors 115 in a number of advantageous respects. First, because infrastructure sensors 150 have a substantially constant field of view, determinations of vehicle 105 and object locations can be accomplished with fewer and simpler processing resources than if movement of the infrastructure sensors 150 also had to be accounted for. Further, the infrastructure sensors 150 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, infrastructure sensors 150 can communicate with the infrastructure element 145 computer 160 via a wired connection, whereas vehicles 105 typically can communicates with infrastructure elements 145 only wirelessly, or only at very limited times when a wired connection is available. Wired communications are typically more reliable and can be faster than wireless communications such as vehicle-to-infrastructure communications or the like.

The infrastructure communications module 155 and infrastructure computer 160 typically have features in common with the vehicle computer 110 and vehicle communications module 130, and therefore will not be described further to avoid redundancy. Although not shown for ease of illustration, the infrastructure element 145 also includes a power source such as a battery, solar power cells, and/or a connection to a power grid.

Figure 2:
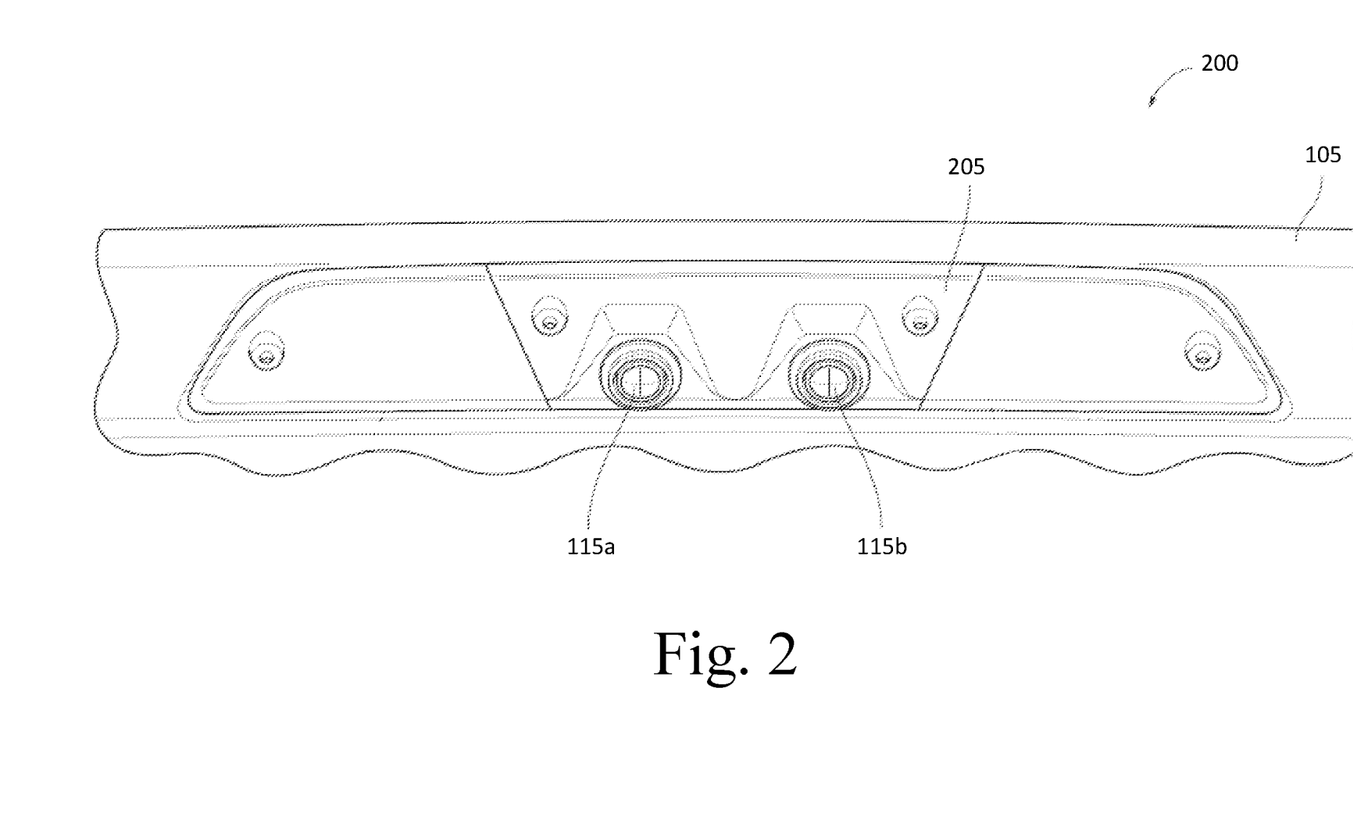
FIG. 2 is a plan view of a sensor assembly including first and second sensors.

Turning now to FIG. 2, the vehicle 105 may include a sensor assembly 200. The sensor assembly 200 includes a housing 205, a first sensor 115a, and a second sensor 115b. The housing 205 may be mounted, e.g., via fasteners, welding, adhesive, etc., to the vehicle 105. The housing 205 may be mounted to a rear, front, and/or side of the vehicle 105 exterior. The vehicle 105 may include any suitable number of sensor assemblies 200, e.g., one or more.

The housing 205 contains the first sensor 115a and the second sensor 115b. The first sensor 115a is a type suitable for detecting objects, e.g., in an environment around the vehicle 105. In particular, the first sensor 115a can be a radar. A radar, as is known, uses radio waves to determine the relative location, angle, and/or velocity of an object by tracking the time required for the radio waves generated by the radar to reflect back to the radar. Alternatively, the first sensor 115a can be an ultrasonic sensor, a UWB transceiver, or any other suitable type of sensor. The first sensor 115a runs at a scanning rate, which is an occurrence interval of generating and transmitting the radio waves, e.g., twice per second, once every two seconds, etc. The power draw, i.e., the rate of power consumption, of the first sensor 115a depends on the scanning rate, i.e., typically is higher for higher scanning rates.

The second sensor 115b is a type suitable for providing detailed data about the environment around the vehicle 105. In particular, the second sensor 115b can be a camera. A camera, as is known, detects electromagnetics radiation in some range of wavelengths. For example, the camera may detect visible light, infrared radiation, ultraviolet light, or some range of wavelengths including visible, infrared, and/or ultraviolet light. The power draw of the second sensor 115b is higher than the power draw of the first sensor 115a for any scanning rate of the first sensor 115a. Alternatively, the second sensor 115b can be an ultrasonic sensor, a UWB transceiver, or any other suitable type of sensor.

The first sensor 115a and the second sensor 115b can be arranged in the housing so that respective fields of view F of the first sensor 115a and the second sensor 115b at least partially overlap. For example, as shown in the Figures, the fields of view F of the first and second sensors 115a, 115b may be identical. The fields of view F of the first and second sensors 115a, 115b encompass an area or, more typically, a three-dimensional space, i.e., a volume, around the vehicle 105. For example, the first and second sensors 115a, 115b can be mounted into a fixed position relative to the housing 205. The first and second sensors 115a, 115b can face in generally a same direction relative to the vehicle 105.

Figure 3A:
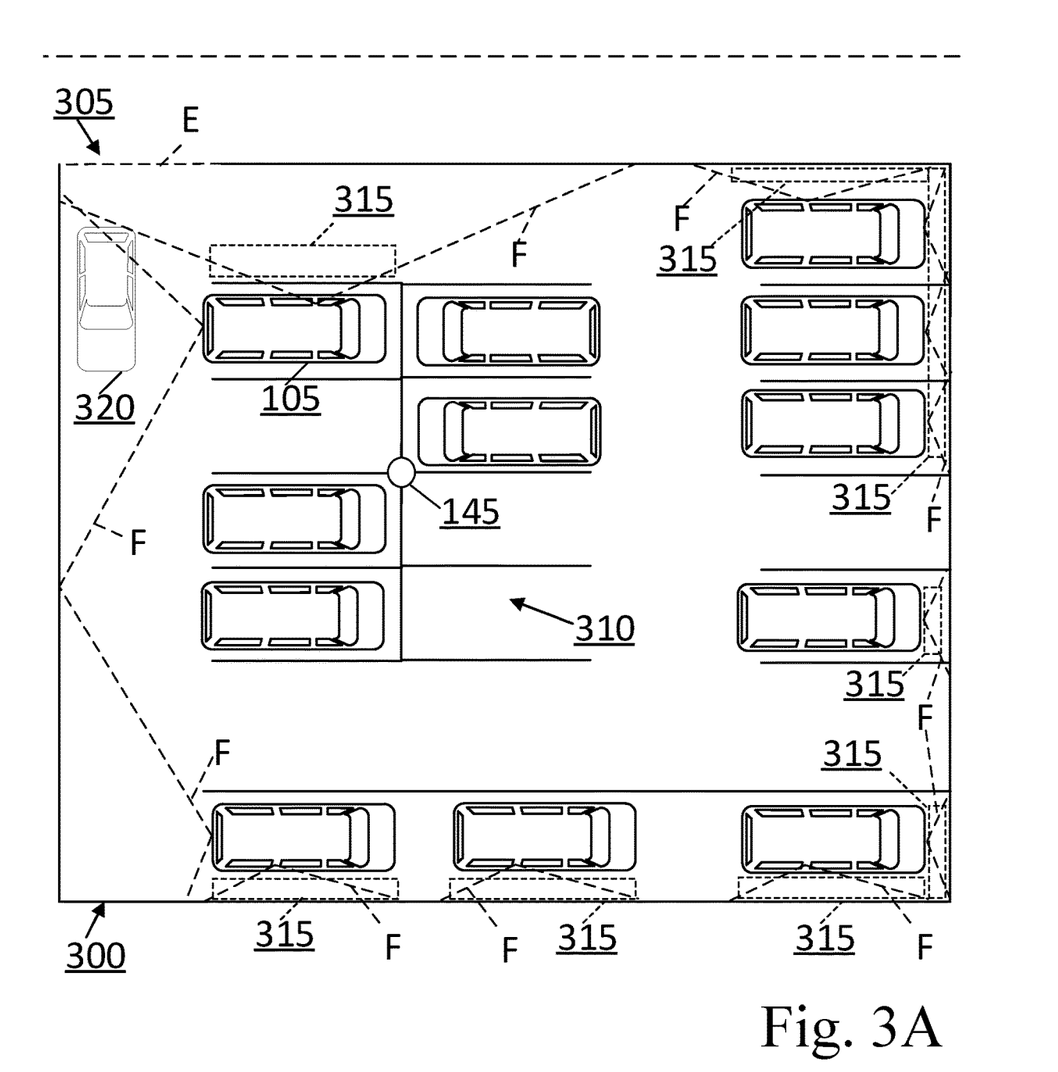
FIGS. 3A-3C are diagrams illustrating identifying objects within a monitored area according to the system of FIG. 1.
Figure 3B:
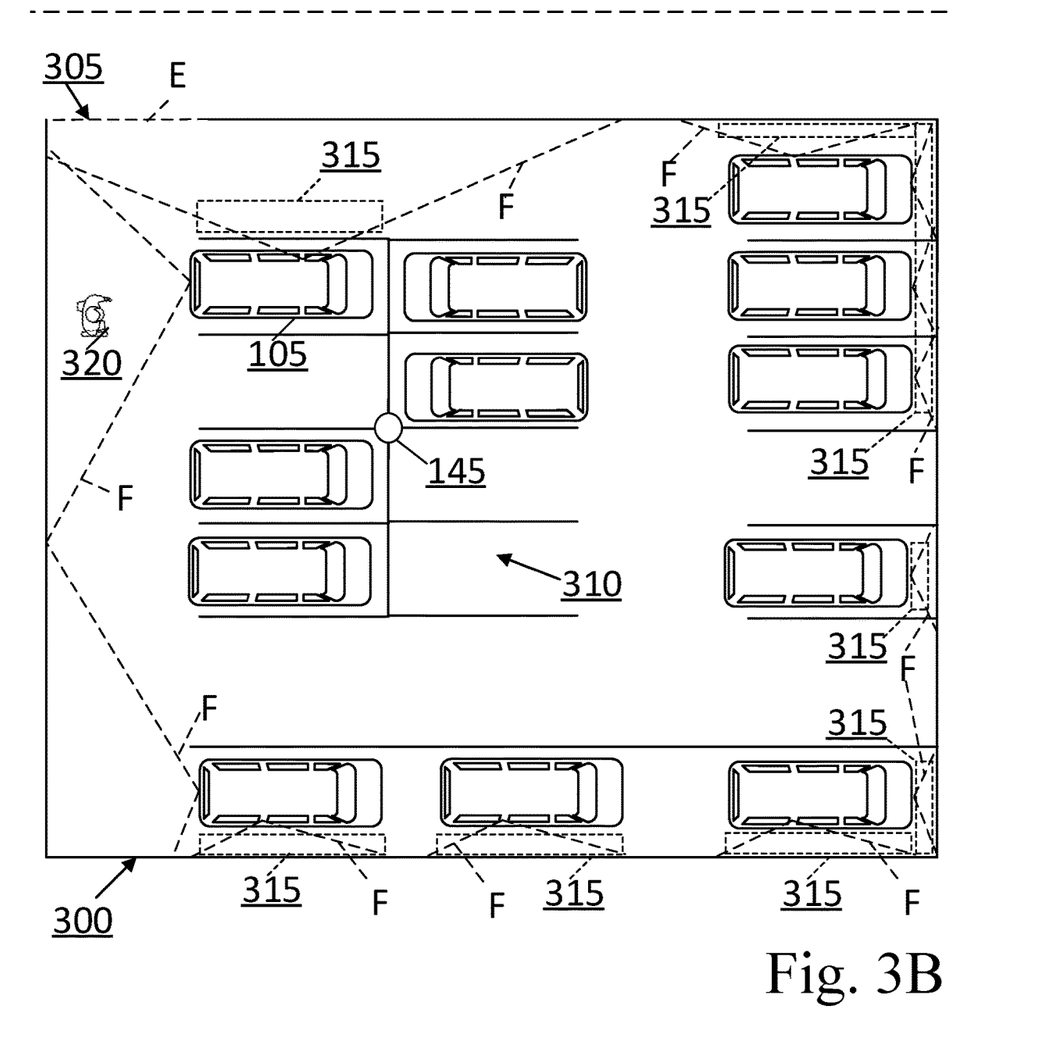
Figure 3C:
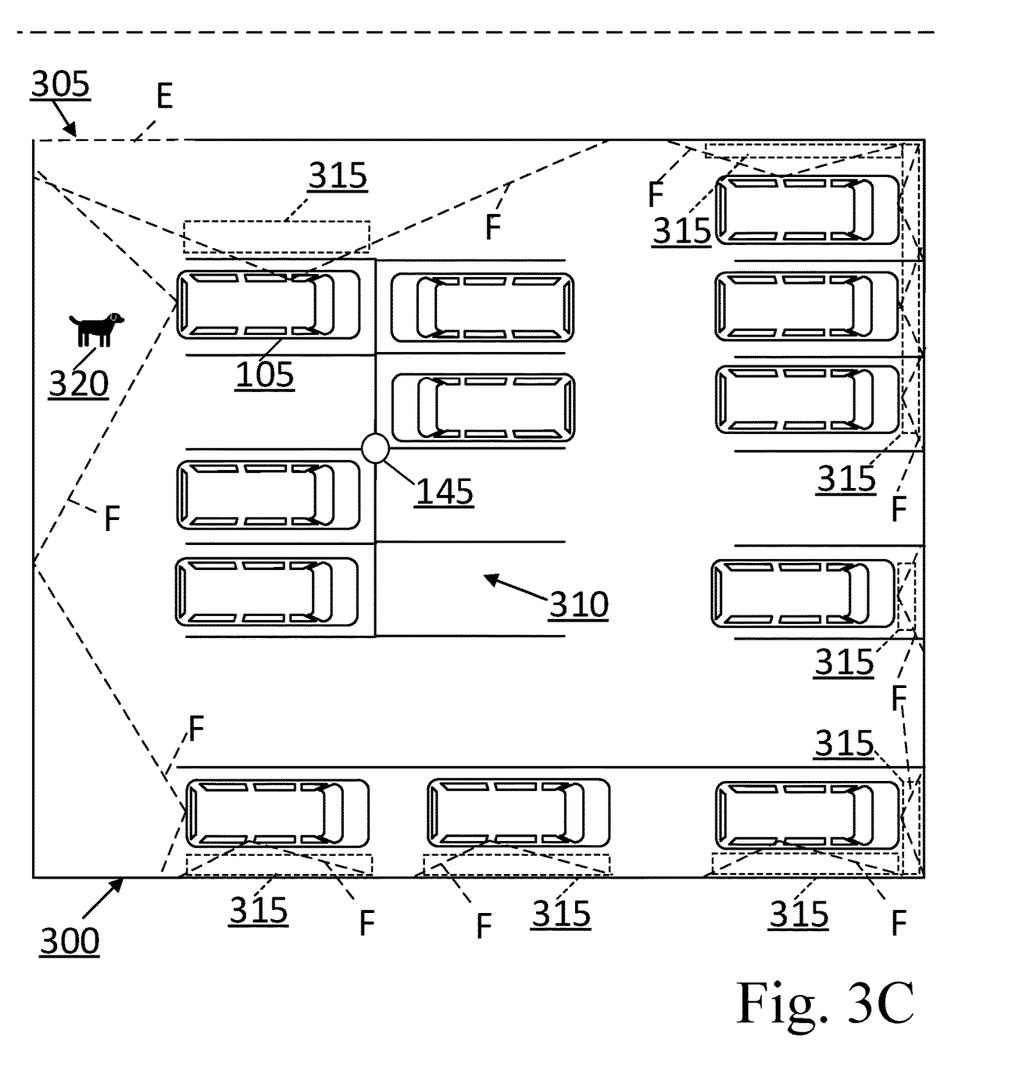

FIG. 3 is a diagram illustrating a vehicle 105 operating in an example monitored area 300 (which in this example is a parking area) that includes marked sub-areas 310 (e.g., parking spaces) for vehicles. The vehicle computer 110 is programmed to determine whether the vehicle 105 is in a monitored area 300. A monitored area 300 is a specified area of ground surface for parking a vehicle. The monitored area 300 may be on a street or road, e.g., an area alongside a curb or an edge of the street, a parking lot or structure or portion thereof, etc. A sub-area 310 may, for example, be a parking space indicated by conventional markings, e.g., painted lines on a ground surface, and conventional image recognition techniques can be employed by the vehicle computer 110 to identify the sub-area 310.

The vehicle computer 110 may be programmed to determine that the vehicle 105 is within the monitored area 300 based on sensor 115 data. For example, the vehicle computer 110 may be programmed to determine that the vehicle 105 is within the monitored area 300, e.g., by GPS-based geo-fencing. A geo-fence herein has the conventional meaning of a boundary for an area defined by sets of geo-coordinates. In such an example, a geo-fence specifies a perimeter of the monitored area 300. The vehicle computer 110 can then determine that the vehicle 105 is within the monitored area 300 based on the location data of the vehicle 105 indicating the vehicle 105 is within the corresponding geo-fence. As another example, the vehicle computer 110 may determine whether the vehicle 105 is in the monitored area 300 based on data, e.g., map data, received from the remote server computer 140. For example, the vehicle computer 110 may receive a location of the vehicle 105, e.g., from a sensor 115, a navigation system, a remote server computer 140, etc. The vehicle computer 110 can compare the location of the vehicle 105 to the map data, e.g., to determine whether the vehicle 105 is in the monitored area 300 specified in the map data.

The vehicle computer 110 is programmed to manage startup and shutdown of the vehicle 105. For example, upon determining the vehicle 105 is in a sub-area 310 based on location data and/or map data, the vehicle computer 110 can shutdown the vehicle 105. That is, the vehicle computer 110 can transition the vehicle 105 between activation states. As another example, the vehicle computer 110 can shutdown the vehicle 105 based on receiving a request from, e.g., the remote server computer 140, user input to a power button in a passenger cabin of the vehicle 105, etc. In this context, an "activation state" specifies a power state of vehicle components 125 and sensors 115, i.e., whether, and/or an amount that, a component 125 and/or sensor 115 is electrically powered during startup and/or shutdown of the vehicle 105, e.g., unpowered, powered with a specific power supply, etc.

The activation state can be one of an off state, a minimal power state, and an on state. In the on state, all vehicle components 125 and sensors 115 are available to be actuated by the vehicle computer 110 to operate the vehicle 105. In the off state, the vehicle components 125 and sensors 115 are substantially powered off to conserve energy when the vehicle 105 is not in use, i.e., parked in the sub-area 310. In the minimal power state, vehicle components 125 and/or sensors 115 may draw power from a power supply for less than all operation when the vehicle 105 is in the on state. That is, the vehicle components 125 and/or sensors 115 draw power for a specific, limited set of operations, e.g., monitoring the environment around the vehicle 105.

The power supply provides electricity to one or more components 125 and sensors 115. The power supply can include one or more batteries, e.g., 12-volt lithium-ion batteries, and one or more power networks to supply power from the batteries to the components 125 and sensors 115. In the on state, the power supply provides power to all of the vehicle components 125 and sensors 115. In the minimal power state, the power supply may provide power to a subset, i.e., some but less than all, of the vehicle components 125 and sensors 115. For example, the power supply may provide power to the first sensor 115a but not to the second sensor 115b. In the off state, the power supply does not provide power to the vehicle components 125 or sensors 115. The vehicle computer 110 can receive power from the power supply regardless of the activation state. The vehicle computer 110 can actuate the power supply based on the activation state.

The vehicle computer 110 may be programmed to transition the vehicle 105 from the off state to the minimal power state based on a time of day. For example, the vehicle computer 110 can receive a sunset time for a current day and a sunrise time for a next day, e.g., from the remote server computer 140 via the network 135. The vehicle computer 110 may maintain a clock and can compare a current time to the received sunset and sunrise times. If the current time is after the sunset time and before the sunrise time, then the vehicle computer 110 transitions the vehicle 105 from the off state to the minimal power state. If the current time is before the sunset time or after the sunrise time, then the vehicle computer 110 maintains the vehicle 105 in the off state. That is, the vehicle computer 110 may transition the vehicle 105 to the minimal power state during nighttime. As another example, the vehicle computer 110 can transition the vehicle 105 to the minimal power state at a predetermined time, e.g., specified by an owner of the vehicle 105 and/or monitored area 300. The predetermined time may be stored, e.g., in a memory of the vehicle computer 110. Additionally, or alternatively, the vehicle computer 110 may be programmed to transition the vehicle 105 to the minimal power state based on receiving a message from the remote server computer 140, e.g., via the network 135.

In the minimal power state, the vehicle computer 110 can determine blind zones 315 within the monitored area 300 for the infrastructure sensor 150. For example, the vehicle computer 110 can define a blind zone 315 within the monitored area 300 based on data from the infrastructure sensor 150. Upon receiving the data from the infrastructure sensor 150, e.g., via the network 135, the vehicle computer 110 can define the blind zone 315 based on a field of view of the infrastructure sensor 150. For example, the infrastructure sensor 150 may have a field of view that encompasses the entire monitored area 300 when no vehicles are in the monitored area 300. When vehicles are parked in the monitored area 300, e.g., in various sub-areas 310, the parked vehicles may obstruct portions of the monitored area 300 from the field of view of the infrastructure sensor 150. The blind zones 315 may be defined from the obstructed portions. Alternatively, a computer 140, 160 can define the blind zones 315 for the monitored area 300 based on data from the infrastructure sensor 150, e.g., in substantially the same manner as discussed immediately above. In this situation, the computer 140, 160 can then provide the blind zones 315 to the vehicle computer 110, e.g., via the network 135.

In the present context, a blind zone 315 is an area or, more typically, a three-dimensional space, i.e., a volume, outside a field of view of the infrastructure sensor 150, i.e., an area or volume from which the infrastructure sensor 150 cannot obtain data. A blind zone 315 for an infrastructure sensor 150 can exist when the infrastructure sensor 150 cannot provide data to detect objects and environmental features within an area or volume. A shape or boundary(ies) of a blind zone 315 is typically defined by features and objects in an environment that occupy, surround, and/or abut the blind zone 315.

In the minimal power state, the vehicle computer 110 determines whether to activate a first sensor 115a of a sensor assembly 200. For example, the vehicle computer 110 can determine to activate a first sensor 115a based on determining that the location of the vehicle 105 is adjacent to a blind zone 315 for the monitored area 300, i.e., no other vehicles are between the vehicle 105 and the blind zone 315. For example, the vehicle computer 110 may receive a location of the vehicle 105, e.g., in substantially the same manner as discussed above, and the vehicle computer 110 can compare the location of the vehicle 105 to the blind zones 315, e.g., to determine whether the vehicle 105 is adjacent to a blind zone 315. Additionally, the vehicle computer 110 may receive respective locations of other vehicles within the monitored area 300, e.g., via V2V communication, and the vehicle computer 110 can compare the location of the vehicle 105 to the locations of the other vehicles, e.g., to determine whether another vehicle is between the blind zone 315 and the vehicle 105.

Additionally, or alternatively, the vehicle computer 110 can determine to activate a first sensor 115a based on determining that the vehicle 105 is adjacent to a boundary, i.e., perimeter, of the monitored area 300. The vehicle computer 110 can determine whether the vehicle 105 is adjacent to the boundary of the monitored area 300, e.g., in substantially the same manner as discussed immediately above.

Additionally, or alternatively, the vehicle computer 110 can determine to activate a first sensor 115a based on receiving an activation message from the remote server computer 140 or another vehicle, e.g., indicating that a vehicle between the vehicle 105 and the blind zone 315 and/or boundary is moving such that the vehicle 105 will be adjacent to the blind zone 315 and/or boundary.

The vehicle computer 110 can activate a first sensor 115a based on a position of the blind zone 315 and/or boundary relative to the vehicle 105. For example, the vehicle computer 110 can activate a first sensor 115a that faces the blind zone 315 and/or the boundary of the monitored area 300. For example, the vehicle computer 110 may activate a first sensor 115a on a side of the vehicle facing the blind zone 315 and/or boundary of the monitored area 300. That is, the vehicle computer 110 activates a first sensor 115a having a field of view F than encompass the blind zone 315 and/or boundary of the monitored area 300. Alternatively, the vehicle computer 110 can activate a first sensor 115a specified in the activation message.

After activating the first sensor 115a, the vehicle computer 110 then instructs the first sensor 115a to run at a scanning rate. The scanning rate may be determined empirically, e.g., based on testing that allows for determining a scanning rate that allows the first sensor 115a to detect an object 320 moving through the field of view F of the first sensor 115a while minimizing the power draw of the first sensor 115a. The vehicle computer 110 can detect objects 320 around the vehicle 105 based on data from the first sensor 115a. For example, the vehicle computer 110 can monitor data from the first sensor 115a to detect an object 320 has moved into the field of view F of the first sensor 115a, e.g., based on determining that radio waves in some direction indicate a shorter distance than previous radio waves in that direction.

The vehicle computer 110 is programmed to transition the vehicle 105 from the minimal power state to the on state based on detecting an object 320 via data from the first sensor 115a. Additionally, or alternatively, the vehicle computer 110 may be programmed to transition the vehicle 105 from the minimal power state to the on state based on receiving a first message from the remote server computer 140. When the vehicle computer 110 transitions the vehicle 105 to the on state, the vehicle computer 110 activates the second sensor 115b of the sensor assembly 200. Additionally, the vehicle computer 110 may activate exterior lighting on the vehicle 105, e.g., to illuminate a field of view F of the second sensor 115b, when the vehicle computer 110 transitions the vehicle 105 to the on state.

While in the on state, the vehicle computer 110 can provide the data from the second sensor 115b to the remote server computer 140, e.g., via the network 135. In an example in which the vehicle computer 110 loses communication with the remote server computer 140, the vehicle computer 110 can generate a time stamp for the data from the second sensor 115b and transmit the data via various frequencies to the remote server computer 140, which may assist in defeating frequency signal jamming attempts.

In the on state, the vehicle computer 110 is programmed to identify the detected object 320 based on data from the second sensor 115b. For example, the vehicle computer 110 can be programmed to classify and/or identify object(s) 320 based on data from the second sensor 115b. For example, object classification techniques can be used, e.g., in the vehicle computer 110 based on lidar sensor 115 data, camera sensor 115 data, etc., to classify a detected object 320 as mobile or stationary, i.e., non-movable. Additionally, or alternatively, object identification techniques can be used, e.g., in the vehicle computer 110 based on lidar sensor 115 data, camera sensor 115 data, etc., to identify a type of object 320, e.g., a vehicle, a pedestrian, etc., as well as physical features of objects. Non-limiting examples of objects 320 include a pedestrian, another vehicle, an animal, etc.

Various techniques such as are known may be used to interpret sensor 115 data and/or to classify objects 320 based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification and/or a classification (i.e., mobile or stationary) of one or more objects 320 or an indication that no object 320 is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of objects 320 identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

Upon identifying the type of object 320 as a pedestrian or a vehicle, the vehicle computer 110 determines whether the object 320 is authorized or unauthorized based on the data from the second sensor 115*b*. In an example in which the object 320 is a vehicle (see FIG. 3A), the vehicle computer 110 can use image recognition techniques to determine an identifier for the vehicle, e.g., a license plate number, a vehicle identification (VIN) number, a make, model, and color of the vehicle, etc. The vehicle computer 110 can then compare the identifier to a stored identifier associated with an authorized vehicle, e.g., stored in a memory. The vehicle computer 110 can determine that the vehicle is authorized based on the identifier matching a stored identifier.

In an example in which the object 320 is a pedestrian (see FIG. 3B), the vehicle computer 110 can perform facial recognition to determine whether the pedestrian's face is an authorized face, i.e., a face of a known authorized person, e.g., stored in a memory. The vehicle computer 110 can use any suitable facial-recognition technique, e.g., template matching; statistical techniques such as principal component analysis (PCA), discrete cosine transform, linear discriminant analysis, locality preserving projections, Gabor wavelet, independent component analysis, or kernel PCA; neural networks such as neural networks with Gabor filters, neural networks with Markov models, or fuzzy neural networks; etc.

Upon determining the object 320 is authorized, the vehicle computer 110 may be programmed to transition the vehicle 105 to the minimal power state. For example, the vehicle computer 110 may initiate a timer upon determining the object 320 is authorized. The timer may have a predetermined duration, e.g., 5 seconds, 30 seconds, 1 minute, etc. The predetermined duration may be stored, e.g., in a memory of the computer. If the vehicle computer 110 fails to detect another object 320 via data from the second sensor 115*b* prior to expiration of the timer, then the vehicle computer 110 can transition the vehicle 105 to the minimal power state. If the vehicle computer 110 detects another object 320 via data from the second sensor 115*b* prior to expiration of the timer, then the vehicle computer 110 maintains the vehicle 105 in the on state. Additionally, upon identifying the type of the object 320 as an animal (see FIG. 3C), the vehicle computer 110 may transition the vehicle to the minimal power state, e.g., in substantially the same manner as discussed immediately above.

Upon determining the object 320 is unauthorized, the vehicle computer 110 may be programmed to actuate an alarm in the vehicle 105. For example, the vehicle computer 110 can actuate one or more vehicle components 125, e.g., speakers, a display, a horn, exterior lights, etc., to output an audio and/or visual alert indicating an unauthorized object 320 is within the monitored area 300.

The vehicle computer 110 may be programmed to operate the vehicle 105 to an updated location within the monitored area 300. For example, upon determining the object 320 is unauthorized, the vehicle computer 110 can operate the vehicle 105 to an exit 305 of the monitored area 300 (see FIG. 4A). For example, the vehicle computer 110 can actuate one or more vehicle components to move the vehicle 105 from a current location to the exit 305. For example, an exit can be defined by a line E that demarcates the monitored area 300 from another area, e.g., a road. That is, an object transitions from the monitored area 300 to the other area at the exit 305. Specifically, the line E extends along a portion of the boundary for the monitored area 300. The vehicle computer 110 can identify the exit 305 based on map data, e.g., received from the remote server computer 140. At the exit 305, the vehicle computer 110 may operate the vehicle 105 to block the exit 305, e.g., such that objects 320 cannot enter or depart the monitored area 300 at the exit 305. In this situation, the vehicle computer 110 can send a message to other vehicles, e.g., via V2V communication, within the monitored area 300 and/or the remote server computer 140, e.g., requesting additional vehicles operate to the exit 305 to assist the vehicle 105 in blocking the exit 305.

Figure 4A:
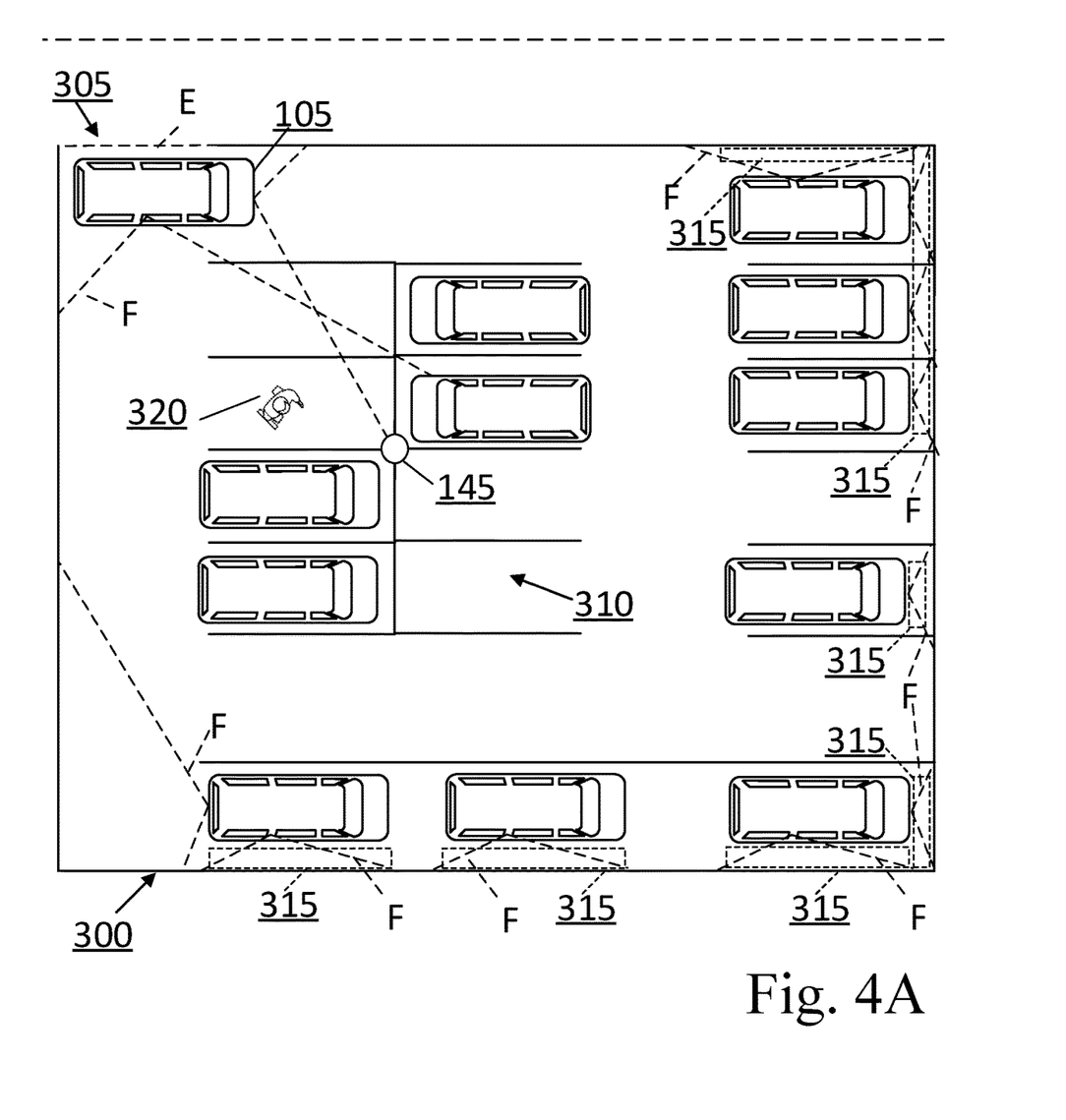
FIGS. 4A-4B are diagrams illustrating operating the vehicle upon identifying an unauthorized object within the monitored area.

As another example, the vehicle computer 110 can receive the updated location from the remote server computer 140. For example, the vehicle computer 110 can receive a second message from the remote server computer 140 that specifies the updated location. For example, the vehicle computer 110 can then operate the vehicle 105 to the updated location, e.g., to obtain data at the specified location. While at the updated location, the vehicle computer 110 can monitor the environment around the vehicle 105 via data from the second sensor 115*b*, e.g., to detect an unauthorized object 320. The vehicle computer 110 can provide the data from the second sensor 115*b* to the remote server computer 140.

The vehicle computer 110 can determine that the unauthorized object 320 departed the monitored area 300 based on sensor 115 data. For example, the vehicle computer 110 can determine that the unauthorized object 320 departed the monitored area 300 via image data, e.g., by using image or pattern recognition techniques to analyze image data including the unauthorized object 320 and output a position of the unauthorized object relative to the boundaries of the monitored area 300. Upon determining that the unauthorized object 320 departed the monitored area 300, the vehicle computer 110 can operate the vehicle 105 to follow the unauthorized object 320 (see FIG. 4B). For example, the vehicle computer 110 can actuate one or more vehicle components 125 to move the vehicle 105 along a path that follows a path of the unauthorized object 320. In this situation, the vehicle computer 110 may operate the vehicle 105 to maintain the unauthorized object 320 within a field of view of at least one sensor 115. Additionally, the vehicle computer 110 may provide sensor 115 data obtained while following the unauthorized object 320 to the remote server computer 140, e.g., via the network 135.

Figure 4B:
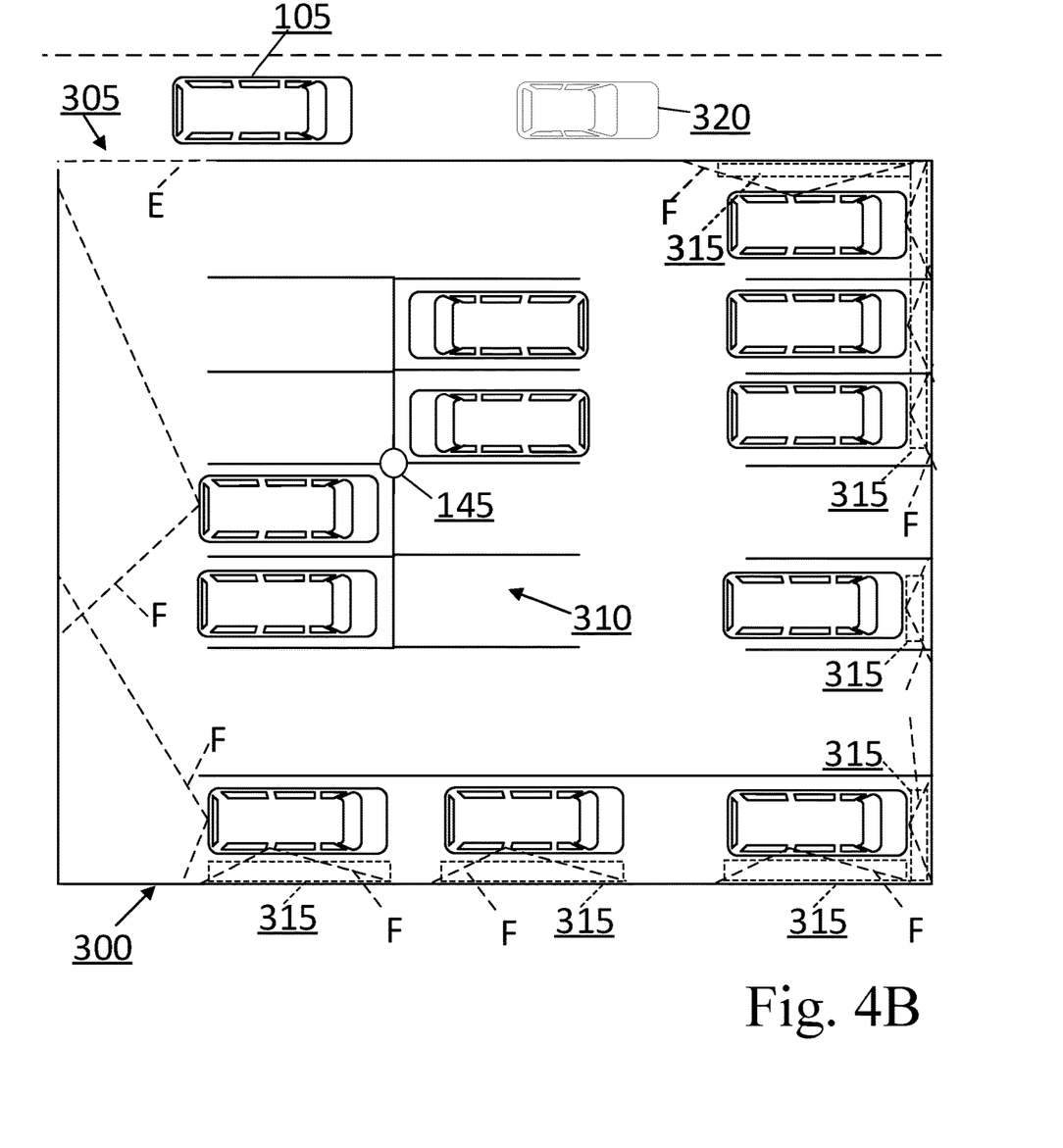

The vehicle computer 110 may be programmed to operate the vehicle 105 to return to the location from the updated location. For example, the vehicle computer 110 may initiate a timer upon arriving at the updated location. The timer may have a predetermined duration, e.g., 5 seconds, 30 seconds, 1 minute, etc. If the vehicle computer 110 fails to detect an object 320 at the updated location prior to expiration of the timer, then the vehicle computer 110 can operate the vehicle 105 to return to the location. If the vehicle computer 110 detects an object 320 at the updated location prior to expiration of the timer, then the vehicle computer 110 can remain at the updated location and provide data, e.g., from the second sensor 115b, to the remote server computer 140. As another example, the vehicle computer 110 may return to the location based on receiving a message from the remote server computer 140 instructing the vehicle 105 to return to the location.

Figure 5:
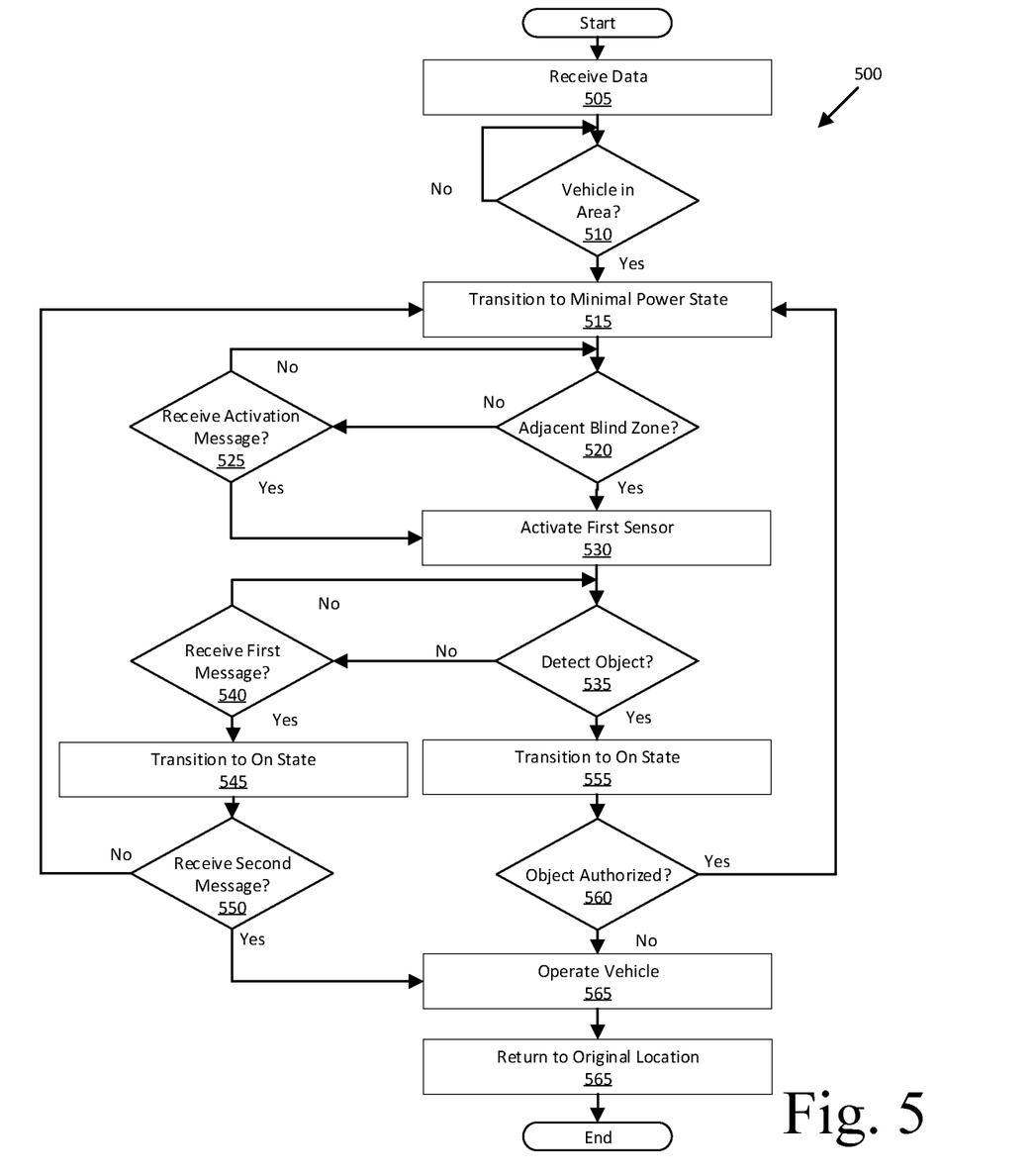
FIG. 5 is a flowchart of an example process for operating the vehicle to monitor the monitored area.

FIG. 5 is a flowchart of an example process 500 for operating a vehicle 105 to monitor a monitored area 300. The process 500 begins in a block 505. The process 500 can be carried out by a vehicle computer 110 included in the vehicle 105 executing program instructions stored in a memory thereof.

In the block 505, the vehicle computer 110 receives data from one or more sensors 115, e.g., via a vehicle network, from a remote server computer 140, e.g., via a network 135, and/or from a computer in another vehicle, e.g., via V2V communications. For example, the vehicle computer 110 can receive location data, e.g., geo-coordinates, of the vehicle 105, e.g., from a sensor 115, a navigation system, etc. The process 500 continues in a block 510.

In the block 510, the vehicle computer 110 determines whether the vehicle 105 is in a monitored area 300 based on map data and/or the received data, e.g., image data and/or location data. For example, the vehicle computer 110 can compare the location of the vehicle 105 to the location of the monitored area 300 to determine whether the vehicle 105 is within a geo-fence of the monitored area 300, as discussed above. As another example, the vehicle computer 110 can compare the location of the vehicle 105 to map data to determine whether the vehicle 105 is in the monitored area 300, as discussed above. The vehicle computer 110 may be programmed to shutdown the vehicle 105, e.g., upon determining that the vehicle 105 is in a sub-area 310 of the monitored area 300. If the vehicle computer 110 determines that the vehicle 105 is in the monitored area 300, then the process 500 continues in a block 515. If the vehicle computer 110 determines that the vehicle 105 is not in a monitored area 300, then the process 500 remains in the block 510.

In the block 515, the vehicle computer 110 transitions the vehicle 105 from the off state to the minimal power state. In the minimal power state, the vehicle computer 110 can actuate a power supply to provide power to a subset, i.e., some but less than all, of the vehicle components 125 and sensors 115, as discussed above. The vehicle computer 110 may transition the vehicle 105 to the minimal power state based on a time of day, as discussed above. Additionally, or alternatively, the vehicle computer 110 may be programmed to transition the vehicle 105 to the minimal power state based on receiving a message from the remote server computer 140, e.g., via the network 135, as discussed above. The process 500 continues in a block 520.

In the block 520, the vehicle computer 110 determines whether the vehicle 105 is adjacent to a blind zone 315 within the monitored area 300 for an infrastructure sensor 150. The vehicle computer 110 can define the blind zone 315 based on a field of view of the infrastructure sensor 150, as discussed above. Upon defining the blind zones 315 within the monitored area 300, the vehicle computer 110 can compare the location of the vehicle 105 to the blind zones 315, e.g., to determine whether the vehicle 105 is adjacent to a blind zone, as discussed above. Additionally, upon receiving locations of other vehicle within the monitored area 300, the vehicle computer 110 can compare the location of the vehicle 105 to the locations of the other vehicles, e.g., to determine whether another vehicle is between the blind zone 315 and the vehicle 105, as discussed above. Additionally, or alternatively, the vehicle computer 110 can determine whether the vehicle 105 is adjacent to a boundary of the monitored area 300, e.g., in substantially the same manner as discussed immediately above. If the vehicle computer 110 determines that the vehicle 105 is adjacent to a blind zone 315 and/or a boundary of the monitored area 300, then the process 500 continues in a block 530. Otherwise, the process 500 continues in a block 525.

In the block 525, the vehicle computer 110 determines whether an activation message has been received from the remote server computer 140, e.g., via the network 135, and/or another vehicle, e.g., via V2V communication. The activation message instructs the vehicle computer 110 to activate a first sensor 115a. If the vehicle computer 110 receives the activation message, then the process 500 continues in the block 530. Otherwise, the process 500 returns to the block 520.

In the block 530, the vehicle computer 110 activates a first sensor 115a. For example, the vehicle computer 110 can activate the first sensor 115a that has a field of view F encompassing the blind zone 315 and/or boundary, as discussed above. As another example, the vehicle computer 110 can activate the first sensor 115a specified by the activation message. The process continues in a block 535.

In the block 535, the vehicle computer 110 determines whether an object 320 has been detected. The vehicle computer 110 instructs the first sensor 115a to run at a scanning rate and monitors the blind zone 315 and/or the boundary via the first sensor 115a, as discussed above. The vehicle computer 110 can detect objects 320 around the vehicle 105 via data from the first sensor 115a, as discussed above. If the vehicle computer 110 detects an object 320 from the first sensor 115a data, then the process 500 continues in a block 555. Otherwise, the process 500 continues in a block 540.

In the block 540, the vehicle computer 110 determines whether a first message has been received from the remote server computer 140, e.g., via the network 135, and/or another vehicle, e.g., via V2V communication. The first message instructs the vehicle computer 110 to transition the vehicle 105 to the on state. If the vehicle computer 110 receives the first message, then the process 500 continues in the block 545. Otherwise, the process 500 returns to the block 535.

In the block 545, the vehicle computer 110 transitions the vehicle 105 to the on state. Upon transitioning the vehicle 105 to the on state, the vehicle computer 110 actuates a second sensor 115b, e.g., specified by the first message. Additionally, the vehicle computer 110 may activate exterior lighting on the vehicle 105, e.g., to illuminate a field of view F of the second sensor 115b, when the vehicle computer 110 transitions the vehicle 105 to the on state. The process 500 continues in a block 550.

In the block 550, the vehicle computer 110 determines whether a second message has been received from the remote server computer 140, e.g., via the network 135, and/or another vehicle, e.g., via V2V communication, within a predetermined time, e.g., 30 seconds, 1 minute, 2 minutes, etc., after transitioning to the on state. The second message instructs the vehicle computer 110 to operate the vehicle 105 to an updated location. If the vehicle computer 110 receives the second message within the predetermined time, then the process 500 continues in the block 565. Otherwise, the process 500 returns to the block 515.

In the block 555, the vehicle computer 110 transitions the vehicle 105 to the on state. The block 555 is substantially the same as the block 545 of process 500 except that in the block 555 the vehicle computer 110 actuates a second sensor 115b having a field of view F that encompasses the blind zone 315 and/or boundary of the monitored area 300. The block 555 will not be described further to avoid redundancy. The process 500 continues in a block 560.

In the block 560, the vehicle computer 110 determines whether the object 320 detected in the block 535 is authorized. The vehicle computer 110 can identify the detected object based on data from the second sensor 115b, as discussed above. If the vehicle computer 110 determines that the detected object 320 is authorized (or an animal), then the process 500 returns to the block 515. Otherwise, the process 500 continues in the block 565.

In the block 565, the vehicle computer 110 operates the vehicle 105. For example, the vehicle computer 110 can operate the vehicle 105 to the updated location, e.g., specified by the second message. As another example, the vehicle computer 110 can operate the vehicle 105 to block an exit 305 of the monitored area 300, as discussed above. As yet another example, the vehicle computer 110 can operate the vehicle 105 to follow the unauthorized object, as discussed above. While operating the vehicle 105, the vehicle computer 110 can provide data, e.g., from the second sensor 115b, to the remote server computer 140. The process 500 continues in a block 570.

In the block 570, the vehicle computer 110 operates the vehicle 105 to return to the location in the monitored area 300 based on, e.g., a timer expiring or receiving a message from the remote server computer 140, as discussed above. The process 500 ends following the block 570.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a first sensor;
   a second sensor having a higher power draw than the first sensor; and
   a computer communicatively coupled to the first sensor and the second sensor;
   wherein the computer includes a processor and a memory, the memory storing instructions executable by the processor to:
   while a vehicle is in a minimal power state, activate the first sensor based on a location of the vehicle within a monitored area;
   transition the vehicle to an on state based on detecting an object via data from the first sensor;
   upon transitioning to the on state, activate a second sensor; and
   then operate the vehicle to block an exit from the monitored area based on identifying the object, via data from the second sensor, as an unauthorized object.

2. The system of claim 1, wherein the first sensor is a radar, and the second sensor is a camera.

3. The system of claim 1, further comprising a housing containing the first sensor and the second sensor.

4. The system of claim 1, wherein the location is adjacent to a boundary of the monitored area.

5. The system of claim 1, wherein the location is adjacent to a blind zone within the monitored area.

6. The system of claim 1, wherein the first sensor is arranged so that a field of view of the first sensor encompasses the blind zone, and the second sensor is arranged so that a field of view of the second sensor encompasses the blind zone.

7. A system, comprising a computer including a processor and a memory, the memory storing instructions executable by the processor to:
   while a vehicle is in a minimal power state, activate a first sensor based on a location of the vehicle within a monitored area;
   transition the vehicle to an on state based on detecting an object via data from the first sensor; and
   then operate the vehicle to block an exit from the monitored area based on identifying the object as an unauthorized object.

8. The system of claim 7, wherein the instructions further include instructions to, upon transitioning the vehicle to the on state, activate a second sensor, wherein the second sensor has a higher power draw than the first sensor.

9. The system of claim 8, wherein the instructions further include instructions to provide data from the second sensor to a remote computer.

10. The system of claim 8, wherein the instructions further include instructions to identify the object based on data from the second sensor.

11. The system of claim 7, wherein the instructions further include instructions to, upon identifying the object as an unauthorized person, actuate an alarm in the vehicle.

12. The system of claim 7, wherein the instructions further include instructions to, upon identifying the object as an animal, transition the vehicle to the minimal power state.

13. The system of claim 7, wherein the instructions further include instructions to, upon transitioning the vehicle to the on state, activate exterior lights of the vehicle.

14. The system of claim 7, wherein the instructions further include instructions to transition the vehicle to the minimal power state based on a time of day.

15. The system of claim 7, wherein the instructions further include instructions to, upon determining that the object has departed the monitored area, operate the vehicle to follow the object.

16. The system of claim 7, wherein the instructions further include instructions to transition the vehicle to the on state additionally based on receiving a first message from a remote computer.

17. The system of claim 16, wherein the instructions further include instructions to operate the vehicle to block the exit from the monitored area additionally based on receiving a second message from the remote computer.

18. The system of claim 7, wherein the location is adjacent to a blind zone within the monitored area.

19. The system of claim 18, wherein the instructions further include instructions to determine the blind zone based on a field of view of an infrastructure sensor within the monitored area.

20. The system of claim 7, wherein the location is adjacent to a boundary of the monitored area.

* * * * *